T. A. WOOLLEY & H. FOX.
MACHINE FOR SHOCKING GRAIN.
APPLICATION FILED JUNE 1, 1914.

1,168,365.

Patented Jan. 18, 1916.
7 SHEETS—SHEET 1.

Fig. 1.

Witnesses.
H. L. Trimble
A. G. Kelly

Inventors.
Thomas Arthur Woolley
Herbert Fox
by H. J. S. Dennison atty

Fig. 3.

T. A. WOOLLEY & H. FOX.
MACHINE FOR SHOCKING GRAIN.
APPLICATION FILED JUNE 1, 1914.

1,168,365.

Patented Jan. 18, 1916.
7 SHEETS—SHEET 5.

Witnesses.

Inventors.

T. A. WOOLLEY & H. FOX.
MACHINE FOR SHOCKING GRAIN.
APPLICATION FILED JUNE 1, 1914.

1,168,365.

Patented Jan. 18, 1916.
7 SHEETS—SHEET 6.

Witnesses.

Inventors.

UNITED STATES PATENT OFFICE.

THOMAS ARTHUR WOOLLEY AND HERBERT FOX, OF HAMILTON, ONTARIO, CANADA.

MACHINE FOR SHOCKING GRAIN.

1,168,365. Specification of Letters Patent. Patented Jan. 18, 1916.

Application filed June 1, 1914. Serial No. 841,987.

*To all whom it may concern:*

Be it known that we, THOMAS ARTHUR WOOLLEY and HERBERT FOX, both subjects of the King of Great Britain, and residents of the city of Hamilton, county of Wentworth, Province of Ontario, in the Dominion of Canada, have invented certain new and useful Improvements in Machines for Shocking Grain, described in the following specification and illustrated in the accompanying drawings, that form part of the same.

The principal objects of the invention are, to facilitate the harvesting of grain by eliminating all manual labor in the shocking operation, thereby effecting a saving in time and expense, and to devise a machine which will gather the sheaves from the binder, form them into a shock and deposit the shock in a standing position upon the ground without the necessity of being bound.

A further object is to produce a machine of this class of a light and durable construction which will not hamper the proper operation of the binder.

The principal feature of the invention consists in the novel construction and arrangement of parts, whereby the sheaves discharged from the binder are gathered automatically and formed into a shock, and whereby the shock when formed is deposited in a standing position, the sheaves being stacked together without the aid of a binding cord.

In the drawings, Fig. 4ª is an end elevational view of Fig. 4 showing the mechanism for directly operating the means for discharging the shock.

Like numerals of reference indicate corresponding parts in each figure.

Referring to the drawings, 1 and 2 are the main supporting bars of the shocker machine. The bar 1 is formed with a jaw end 3 which is pivotally secured to the bar 4 arranged beneath the grain table 5 at the front side of the binder machine. The bar 1 extends angularly upward from its pivotal connection for about half its length and then extends horizontally.

6 is a bracket secured to the outer end of the bar 1 and formed with a vertical journal bearing 7 in which the stem of the caster wheel 8 is journaled.

The bar 2 is arranged beneath the bar 1 and is rigidly secured to the bracket 6 and extends inwardly toward the binder parallel with the horizontal portion of the bar 1 and at a point beneath the bend of the bar 1 it is bent rearwardly at an obtuse angle and extends inwardly toward the binder machine and is provided with a jaw-shaped end 9 which is pivotally secured to a bar 10 arranged beneath the grain deck of the binder machine at the rear.

The bars 1 and 2 are rigidly secured together at their point of crossing by block and clevis bolt 11.

Figure 1:
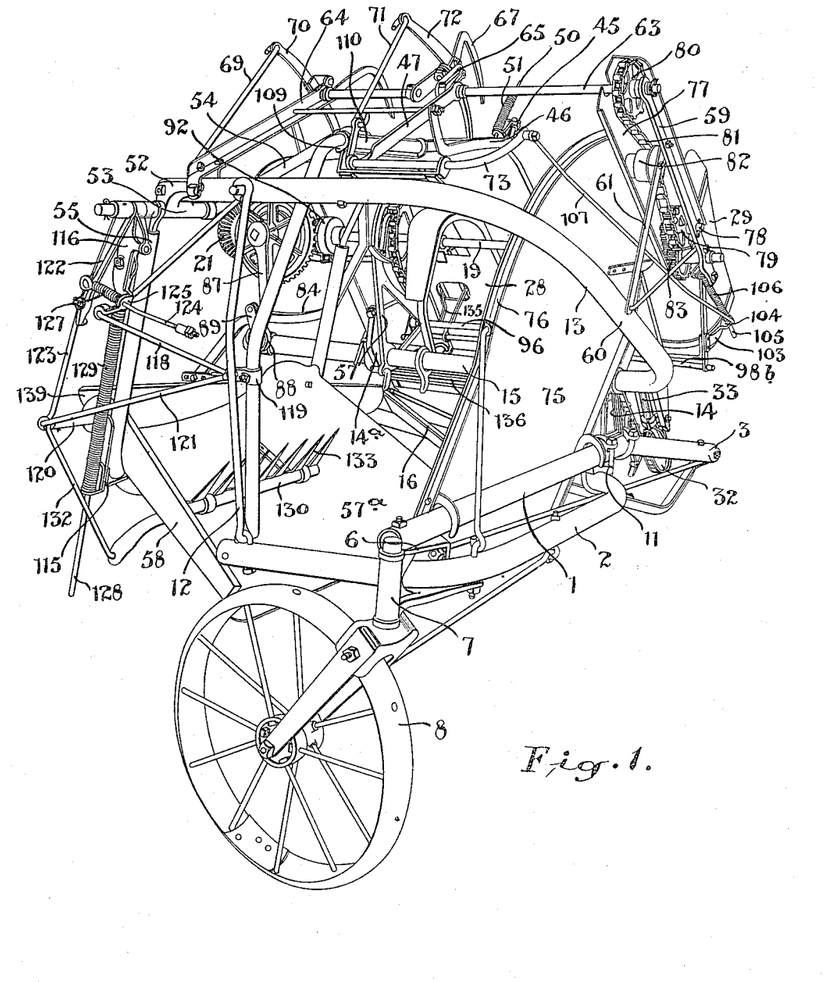
Figure 1 is a perspective view of the machine taken from the front and outer side.
Figure 2:
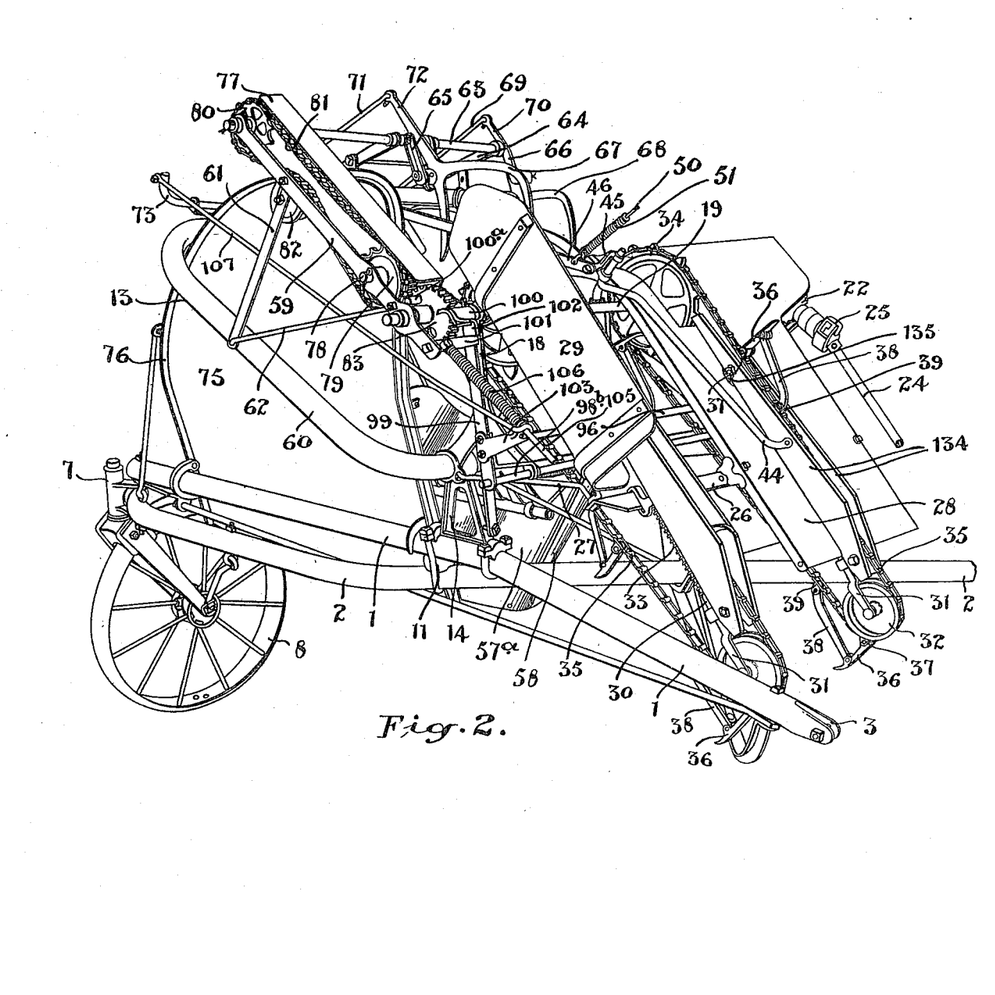
Fig. 2 is a perspective view of the machine taken from the front and inner side adjacent to the binder.

The outer end of the bar 2 is bent rearwardly from the bracket 6 and at its extremity carries a vertically disposed rod 12, 13 is a U-shaped frame arranged above the main support bars 1 and 2, the outer side being supported at its extremity by the vertical bar 12. The frame 13 is tilted downwardly and inwardly and the inner side 15 is slidably supported at the front end in a bracket 14 rigidly secured to the bar 1 and at the rear end by a bracket 14ᵃ which is rigidly supported by a bar 16 extending across the inwardly extending angular portion 17 of the bar 2. The bar 16 is rigidly secured to the bar 2 midway of its length and at its inner end is secured to the inner end of the bar 1 as shown in Fig. 2.

18 is a member extending upwardly from the bracket 14 and supporting one end of the main operating shaft 19.

20 is a strut extending upwardly from the frame member 15 and supporting the rear end of the main operating shaft.

21 is a beveled gear keyed to the rear end of the main operating shaft 19.

22 is a beveled pinion supported in a journal 23 carried by the member 20 and operated by a slip shaft 24 connected thereto by a universal joint 25. The shaft 24 is operated from the binder machine mechanism.

26 is an angle bar supported in a horizontal position parallel with the inner side 15 of the frame 13 by the rod supports 27.

28 is the sheaf carrier deck rigidly secured to the angle bar 26 and extending angularly upward over the shaft 19. The deck 28 is formed of sheet metal which holds the sheaves from contact with the operating mechanism arranged therebeneath.

29 is a butter plate of sheet metal arranged at the forward side of the sheaf carrier deck and is adapted to guide the butts of the sheaves in their upward travel.

The lower end of the carrier deck 28 extends below the lower edge of the grain table of the binding machine.

30 are rods slidably arranged in brackets carried beneath the deck 28 having jaw shaped ends 31 in which are journaled the grooved wheels 32.

33 are spiral springs encircling the rods 30 holding said rods to their downward position with a spring tension.

34 are sprocket wheels secured to the shaft 19 and arranged in alinement with the grooved wheels 32 carried on the jaw ends of the rods 30.

35 are endless sprocket chains extending around the sprocket wheels 34 and around the grooved wheels 32 and forming endless carriers adapted to carry the sheaves discharged from the grain deck of the binder machine upwardly.

36 are spur members pivotally secured to the links 37 of the endless chains.

38 are bars hinged to the back of the spur members 36 adjacent to the top thereof and having the outer ends bent inwardly toward the chains and pivotally connected to the links 39. This arrangement provides a flexibility in the spur members and their supports allowing them to circle around the sprockets and grooved wheels without binding and as the said spur members pass around said wheels the pivotal joint between the spur and the arm straightens out so that the spur closes down toward the chain so as to avoid digging into and tearing the sheaves which are passed onward into the shock receptacle which is hereinafter described.

40 is a sheaf stripper attached to the knotter on the binder machine, the outer end of which is supported by a rod 41 extending through a rigid bracket 42.

43 is a spiral spring encircling the rod 41 adapted to exert a yielding pressure against the sheaves.

44 is a rod pivotally connected to the stripper and extending angularly upward therefrom substantially parallel with the sheaf carriers, the upper end thereof being bent upwardly and journaled in a bracket 45 which is pivotally supported at the apex of a V-shaped bar 46. The bar 46 extends horizontally outward and the outer ends are connected to a bar 47 which is rigidly secured to the outer side 48 of the frame 13.

The bracket 45 is provided with a rearwardly extending lug 49 through which a rod 50 pivotally secured to the bar 46 extends, said rod having a spiral spring 51 thereon exerting a downward pressure on the lug and consequently an upwardly tilting pressure on the bracket and the bar 44 carried thereby.

52 is a bracket secured to the rear end of the upper side 48 of the U-frame 13 having an elongated journal portion 53 in which is journaled the crank rod 54.

55 is a bail pivoted upon the end of the crank rod extending outwardly from the bearing 53 and extending downwardly therefrom in U-shaped formation having the terminal end of the inner side pivoted in a bearing arranged at the upper end of the supporting member 57 carried on the inner side portion 15 of the U-frame 13. The journal support of the inner side of the bail is arranged in alinement with the crank rod 54 so that the axes of rotation of each side of the bail are in alinement.

57ᵃ is a scoop-shaped member rigidly secured to the bottom of the bail and having the upturned side flanges 58 and being arranged in a normally sloping position, the forward end being lowermost.

59 is a flat bar supported above and substantially parallel with the transverse end 60 of the U-frame 13 by the rods 61 and 62. The lower end of the bar 59 encircles the main operating shaft 19.

63 is a packer shaft journaled at one end in the upper end of the bar 59 and at the other end in a bar 64 rigidly connected to the rear end of the outer side 48 of the U-frame 13.

The packer shaft 63 is formed with a crank 65 about mid-way of its length and a crank 66 at its rear end.

67 and 68 are the packer forks journaled upon the cranks 65 and 66.

69 is a link having one end pivotally connected to the upwardly extending arm 70 of the packer 68 and the other end connected to the bar 64 and as the packer shaft is rotated the fork will be given an oscillating motion.

71 is a link connected at one end to the arm 72 of the packer 67 and at its other end to the crank rod 73 journaled in a bracket 74 carried on the outer side of the frame 13, said link fulfilling the same function as the link 69.

75 is a sheet metal guard secured at its bottom to the horizontal portion of the bar 1 and extending upwardly inside the U-frame 13, said shield having a rigid angle bar frame 76.

77 is a shield secured at the upper end of the shield 75 and arranged inside and parallel to the bar 59.

78 is a pin extending between the bar 59 and shield 77 a short distance from the shaft 19 having the combined spur pinion and sprocket wheel 79 journaled thereon.

80 is a sprocket wheel secured to the end of the packer shaft 63 and in alinement with the sprocket 79.

81 is an endless sprocket chain extending around the sprockets 79 and 80.

82 is a flanged idler wheel supported on a pin carried by the rod 61 and supporting the underside of the endless chain 81.

83 is a spur gear wheel secured on the main operating shaft 19 and meshing with the pinion 79 and completing the operative connection for rotating the packer shaft 63.

84 is a cam bar for operating the sheaf receptacle carried on the inner end of the bail 55 adjacent to the bracket 56 and extending downwardly and rearwardly therefrom.

85 is a rod adjustably secured at one end to the lower extremity of the bar 84 and having its opposite end rigidly connected to the bail 55 close to the bottom.

86 is a beveled gear wheel supported on a journal carried on the shaft supporting bracket 20 having its axis arranged perpendicular to the axis of the shaft 19.

87 is a crank arm secured to the outer side of the beveled gear wheel 86 and carrying at its outer end a roller 88 adapted to engage the underside of the cam bar 84.

89 is a yoke pivotally connected to the journal pin of the roller 88 and extending on either side of the bar 84 and carrying a small roller 90 which engages the upper surface of the bar 84. The crank arm on rotation swings the bar 84 in an upward direction, thereby swinging the sheaf receptacle 70 to discharge the shock.

91 is a beveled pinion mounted on the main operating shaft 19 and meshing with the bevel gear 86 having a clutch member 92 connected thereto.

93 is a trip arm pivotally supported between the bracket member 20 and the member 94 being adapted to engage the clutch 92 to hold the pinion 91 out of gear with the main operating shaft. The arm 93 is operated to release a portion of the clutch which causes it to engage and rotate the pinion and consequently the gear 86.

95 is a cam carried on the gear 86 which engages and holds the arm 93 out of operating contact with the clutch until the gear 86 makes a complete revolution.

96 is a rod horizontally supported in the brackets 18 and 98 extending inwardly from the lower inner side 15 of the U-frame 13, said rod having crank members 97 and 98$^a$ at the ends in which is carried a rod 98$^b$.

98$^c$ is a link connected to the crank end 97 of the rod 96 and to an arm 93$^a$ extending from the trip arm 93.

99 is a bar secured to the forward end of the rod 98$^b$ and extending upwardly in an outwardly angular direction having a hook-shaped upper end 100 adapted to engage a crank pin 100$^a$ projecting laterally from the forward side of the spur pinion 83 carried on the main shaft 19. The hook member on engagement with the pin is adapted to lift the rod 98$^b$ to operate the trip arm 93.

101 is a loop member pivotally secured to the lower end of the bar 59 and extending around the bar 99 immediately back of the hook member 100 which hook member is provided with an upwardly extending spur 102.

103 is a bracket rigidly secured to the bar 99 adjacent to its lower end having an eye-shaped end 104 through which a rod 105 pivotally secured to the loop 101 extends.

106 is a spiral spring encircling the rod 105 between the loop 101 and bracket 103 and normally holding the arm 99 so that the hook member will not engage the pin on the spur pinion.

107 is a rod formed with an eye-shaped end encircling the end of the rod 105 projecting beyond the eye end of the bracket 103, said rod extending outwardly and connected at its outer end to the crank rod 73. The rod 107 is adapted to operate the trip mechanism when a resisting pressure against the packer 67 overcomes the pressure of the spring 106.

The crank portion of the crank rod 54 journaled at the rear end of the upper side of the U frame 13 extends angularly upward and forward and has secured to its extremity an angle bar 108 which is provided with laterally turned end portions 109 in which is secured the horizontal portion 110 of the guide 111 which guide bar extends angularly outward and downward to a point about opposite the rearward end of the main support bar 2.

112 is a piece of flat iron formed into a substantially S-shape and pivoted centrally on the angle bar 108 having the forked points 113 extending downwardly to engage the top sheaves of the shock.

114 is a bracket member rigidly secured to the outer side of the bail 55 at its lower portion adjacent to the scoop, said bracket having an outwardly extending lug 115 at the bottom.

116 is an arm loosely mounted on the outer end of the crank rod 54 and held rigid by the rod 117 secured at one end to said arm intermediate of its length and at the other end to the U frame 13.

118 is a rod pivotally secured at one end to the lower end of the arm 116 and at the other end to a bracket 119 rigidly secured intermediate of the height of the guide bar 111.

120 is a link pivotally secured to the upper end of the bracket 114 and extending rearwardly therefrom having a rod 121 pivoted on the outer end thereof and pivotally connected to the bracket 119 on the guide bar 111.

122 is an arm pivotally secured on the outer end of the crank rod 54 and having a laterally turned finger 122ª at its extremity.

123 is a rod pivotally secured at one end to the outer end of the arm 122 and at the other end to the outer end of the link 120 and adapted to engage the finger 122ª.

124 is a rod pivotally secured to the arm 122 intermediate of its length and extending through an eye-portion 125 formed in the arm 116 adjacent to the lower end. This rod is provided with an adjustable stop at the outer end in the form of a nut 126 and a spiral spring 127 is arranged encircling the rod 124 between the eye 125 and the point of connection to the arm 122.

128 is a rod pivotally connected intermediate of the length of the arm 116 on the inner side thereof and extending downwardly through the laterally extending lug portion 115 at the bottom of the bracket 114 secured to the bail.

129 is a compression spring encircling the rod 128.

130 is a bar extending across and pivotally supported in the bottom of the sheaf receptacle 57ª intermediate of its length, said bar having a crank end 131 projecting through the outer side of the scoop and having a rod 132 connected to its extremity and to the outer end of the link 120.

133 are broad flat teeth of an inverted V-shape secured to the bar 130 and arranged to extend upwardly substantially at right angles to the bottom of the sheaf receptacle when said receptacle is in its lowermost position, and forming V-shaped openings into which the straw wedges tightly.

134 are guide bars arranged in pairs and extending each side of the endless chain carriers 35. These guides are pivotally supported at the lower ends and extend upwardly above the chain and are tapered toward the upper end. The upper ends of the guides are supported by fork-shaped members 135 which project upwardly through openings in the sheaf carrier guides 28 and are supported upon the rod 98ᵇ being raised on the operation of the tripping mechanism by the raising of said rod through the mechanism described and elevating the upper ends of the guides to a point above the tops of the spurs 36 carried by the endless chain carriers 35. This arrangement prevents the sheaf carriers from carrying the sheaves upwardly and delivering same while the sheaf receptacle is being discharged.

The frame 13 is slidably supported in the main shaft supporting brackets carried on the sub-frame and the sheaf carrier deck and the rearward carrier 35 and its supports are supported from said U-frame. This adjustable feature provides for the proper handling of different lengths of sheaves.

The frame 13 and the parts carried thereon are adjusted by means of a rack 136 and worm 137 which is operated by a crank 138 at the rear end.

139 is a guard or shoe rigidly supported below the inner side of the U-frame 13 and extending to the rear of the sheaf receptacle having its rear end beveled inwardly toward the top and adapted to engage and steady the sheaf as it is deposited upon the ground.

In the operation of this machine, the shocking machine is connected to the binder machine in the manner hereinbefore described and travels alongside of said machine on the discharge side. As the grain is cut it is formed into sheaves on the grain deck of the binder machine and on being discharged therefrom the sheaves are carried upwardly by the endless carriers 35, the spur members 36 engaging the sheaves and the pressure rod 44 holding said sheaves down to the carriers with a spring pressure. As the sheaves reach the upper end of the endless carriers they are discharged into the sheaf receptacle formed by the scoop 57, the butts engaging the shield 75 and resting thereagainst. The main operating shaft 19 of the shocker machine operates continuously as also does the packer shaft 63 carrying the packer forks 67 and 68. These packer forks engage the sheaves as they are delivered from the endless carriers 35 and distribute them to the sheaf receptacle, the outward sheaves falling against and being held in position by the guide bar 111. The sheaves falling into the sheaf receptacle are held from slipping by the teeth 133 on the bar 130 and when the bulk of the sheaves deposited in said receptacle reaches the proper amount, the packer fork 67 in its rotation meeting with the resistance of the bulk of the sheaves pushes upon the link 71 rotating the crank rod 73 so as to pull upon the rod 107 thereby swinging the bar 99 upon its pivot and moving the hook member 100 into the path of the pin 100ª carried on the spur gear 83. As the bar 99 swings upon its pivot the loop 101, being pressed upwardly by the spring 106 on the rod 105, mounts the spur 102 on the back of said arm and thus holds the hook member in position to engage the pin of the spur gear so that the instantaneous operation of the packer arm rotating the crank rod 73 places the hook member in position to await the movement of the crank pin 100ª. Upon the pin 100ª engaging the hook member the rod 98ᵇ is lifted upwardly and upon the lifting of said rod the trip arm 93 is operated to release the clutch, thereby causing the rotation of the bevel gear 86. The upward movement of the rod 98ᵇ raises the fork members 135 carried thereon and swings the chain guards 134 upwardly on their pivots to guard the carrier chains 35 and prevent the further upward movement of the sheaves from the binder. On the rotation of the beveled gear 86 the roller 88 carried on the crank arm 87 engages the downwardly extending angularly set end of the cam bar 84 and as said bar is connected to the sheaf receptacle by the rod 85 the bail 55 is swung rearwardly on its pivot throwing the scoop portion of the sheaf receptacle first into a vertical position to deposit the sheaves therein butt end upon the ground.

At the commencement of the movement of the sheaf receptacle the rod 121 extending between the sheaf receptacle and the guide bar 111 pulls upon same in a rearward direction but the rod 118 interposed between the stationary arm 116 and the bar 111 acts as a pivotal strut thereby causing the bar 111 to move downwardly and remain substantially parallel with the bail. This draws the top side of the guide bar, which is pivotally connected to the crank 54 in tightly against the top of the sheaves and with the teeth 133 in the receptacle holding the shock securely from slipping as it is being tipped.

The finger 122ª on the arm 122 engages the rod 123 in locking contact forming a strut and the link 120 and rod 132 remain in their normal relationship as the bail swings on its pivot, the teeth 133 being retained in engagement with the sheaves. When the stop 126 on the end of the rod 124 comes into contact with the eye 125 on the stationary arm 116 the further rotation of the pivotal arm 122 is checked. This immediately breaks the joint between the arm 122 and the rod 123 with the result that the weight of the shock bearing upon the teeth 133 rotates the bar 130 and the shock is thus released. As the bar 130 rotates the crank 131, rod 132 and link 120 swing freely as also do the rod 123 and arm 122. The rotation of the link 120 throws the said link and rod 121 out of alinement and arrests the swinging of the guide bar 111 thus completely releasing the shock.

Figure 3:
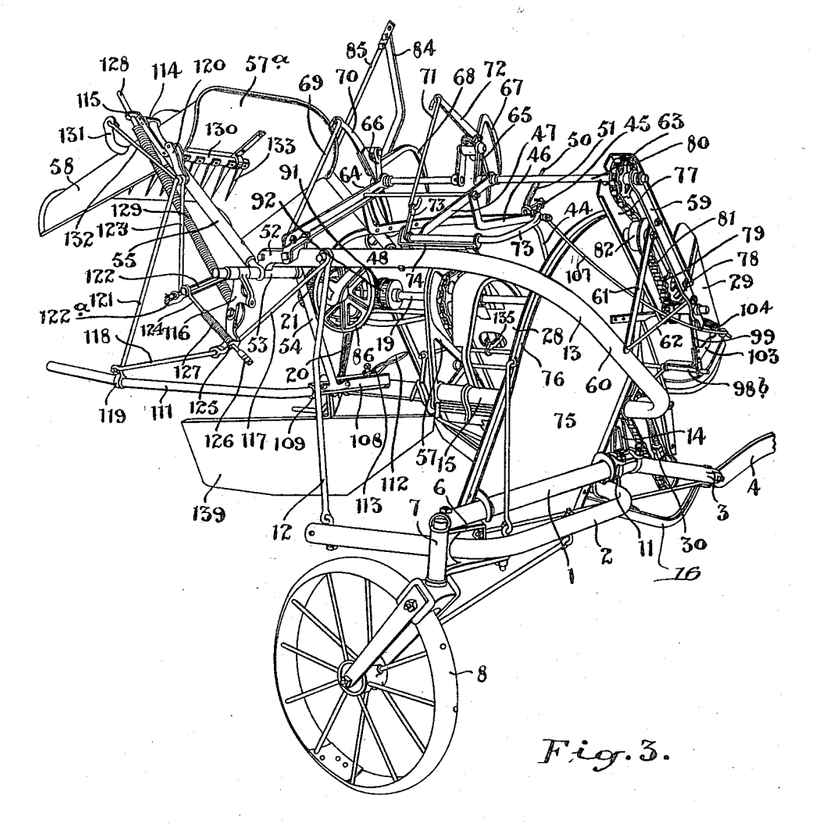
Fig. 3 is a perspective view of the machine taken from the front and outer side showing the parts in the position assumed immediately following the delivery of the shock.
Figure 4:
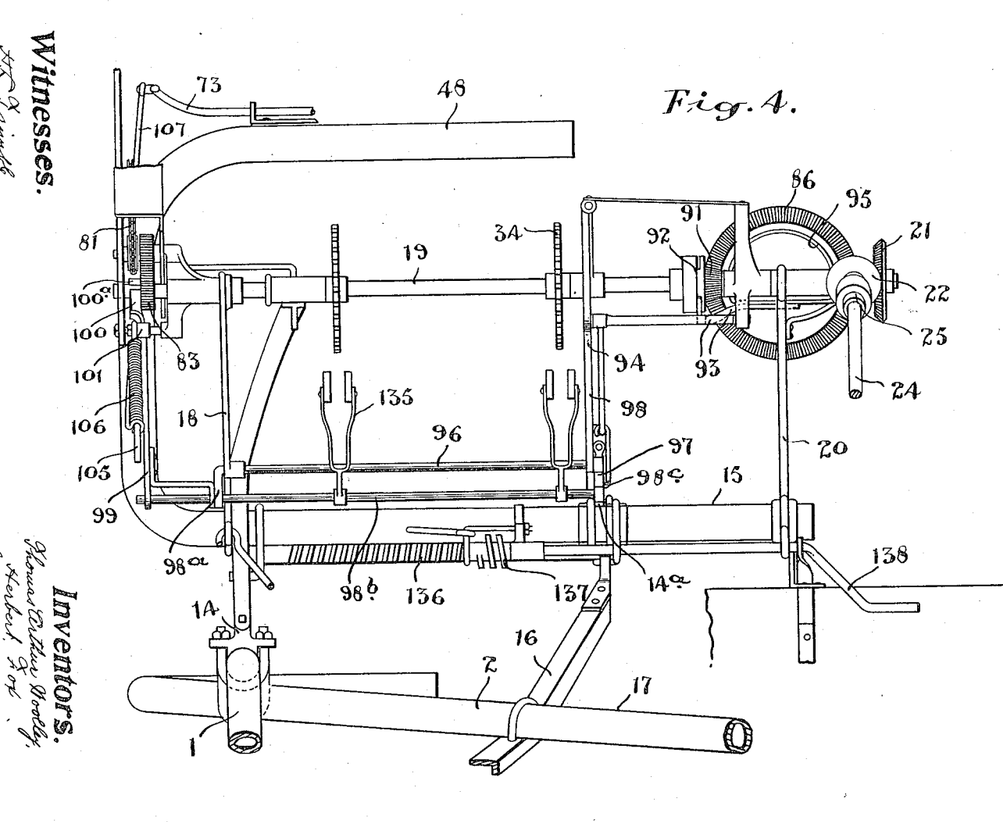
Fig. 4 is a skeleton elevational view taken from the inner side of the machine and showing the mechanism for tripping and operating the discharge of the shock and for adjusting the machine for different lengths of grain.
Figure 4A:
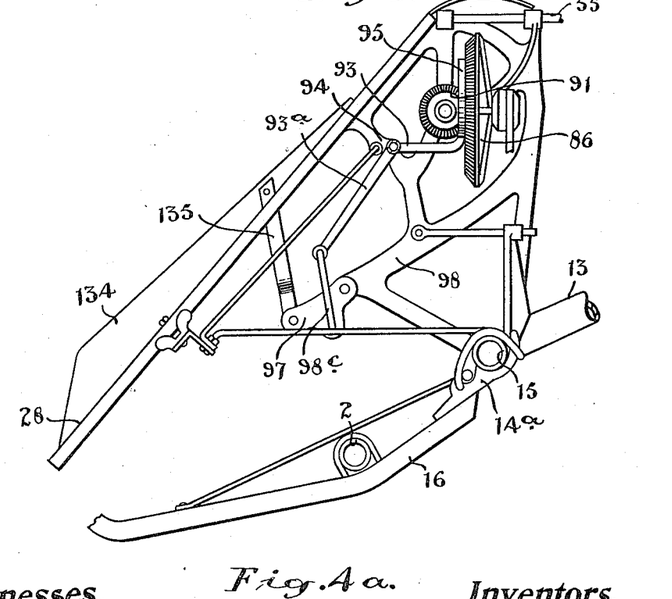
Figure 5:
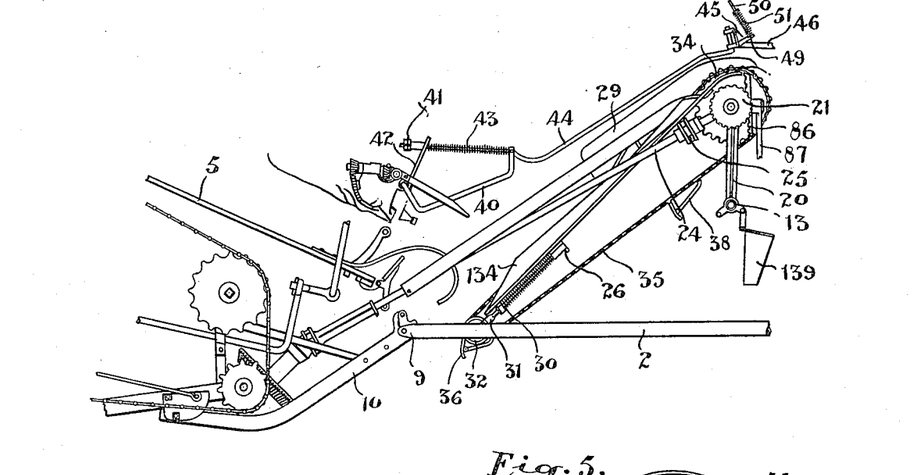
Fig. 5 is an elevational detail view taken from the rear side of the machine showing the manner of connecting same to the binder machine.
Figure 6:
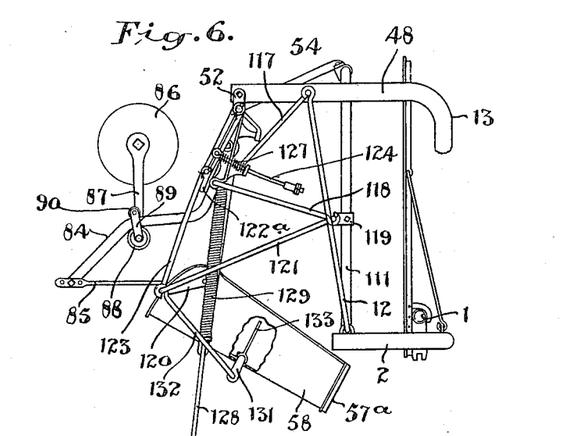
Fig. 6 is an elevational detail view from the outer side showing the relative position of the parts when the sheaf receptacle is in the lower position ready to receive the sheaves.
Figure 7:
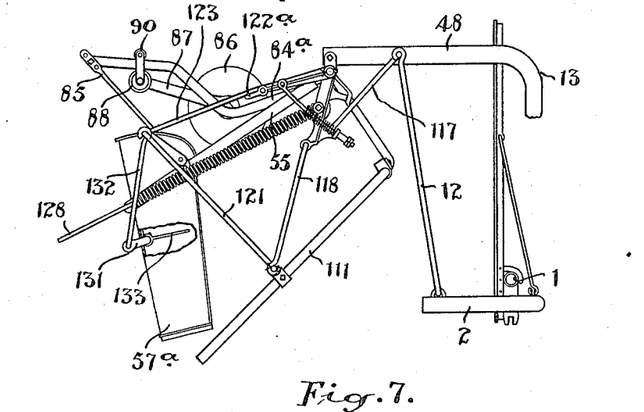
Fig. 7 is a view similar to Fig. 6 showing the position of the parts with the sheaf receptacle in the vertical position just about to release the shock to deposit it upon the ground.
Figure 8:
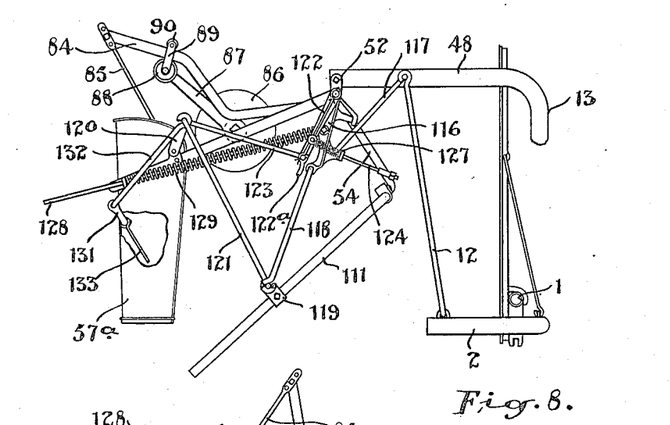
Fig. 8 is a view similar to Fig. 7 showing the relative position of the parts immediately following the release of the shock.
Figure 9:
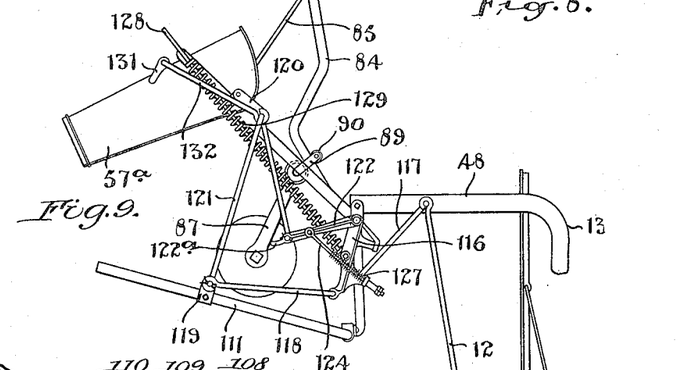
Fig. 9 is a view similar to Figs. 6, 7 and 8 showing the relative position of the parts with the sheaf receptacle raised to its uppermost position to clear the top of the shock.
Figure 10:
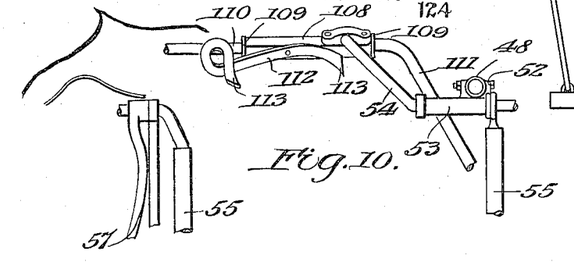
Fig. 10 is an elevational detail from the rear of the machine, illustrating the means for engaging the top sheaves of the shock.

As the crank arm 87 continues its rotation it swings the cam bar 84 upwardly to the extreme raised position illustrated in Figs. 3 and 9 and in this position the sheaf receptacle is raised clear of the heads of the shock so that the machine in its forward travel will clear the same.

It will be noted that the bar 128 is pivoted upon the arm 116 below the pivot point of the bail and immediately the bail swings from its normal resting position the leg of the bail and rod 128 move apart, and the compression spring 129 encircling the rod 128 assists in the lifting movement of the sheaf receptacle.

The sheaf receptacle is held in its raised position until the roller 88 moves beyond the extremity of the upper angle portion 84ª of the cam bar 84 when the strut support of the crank arm is removed and the cam bar and bail and sheaf receptacle immediately drop. The continuation of the movement of the crank 87 in its downward travel through the yoke 89 and roller 90, insures the return of the parts to their normal position.

On removal of the strut support for the sheaf receptacle in the form of the crank arm 87 the weight of the parts is immediately released from restraint and will drop very suddenly but for the restraining influence of the spring 129 on the rod 128 which being of considerable length relieves the jolt of the return of the parts. As the parts swing back to their normal position the spring 127 on the rod 124 withholds the return movement of the arm 122 so that the rod 123 is again brought into locking engagement therewith and the link 120, rod 132 and bar 130 are returned to their normal positions.

The entire operation of loading, packing, discharging of the shock and the return of the parts to their normal position is automatic. The sheaves are held securely during the loading of the shock and are packed tightly into position to form a self-supporting shock when placed upon the ground. The last sheaf of the shock being received on the open side of the receptacle is not however, susceptible to being pressed into place and interlocked with the other sheaves and the guard plate or shoe 139 engages the sheaf about mid-way of its height and being set slightly out of parallel relation with the frame 13, the tail end gives the sheaf a slight push inward the bottom beveled portion allowing for the spread of the butts of the grain.

It will be particularly noted that the connections of the shocker with the binder machine are very flexible, consequently the machine will accommodate itself to uneven ground without in any way hampering the effective work of the binder.

The caster wheel support for the outer side of the shocker machine facilitates its easy handling in transport from place to place as it may be readily swung to allow the machine to travel endwise when the binder machine is placed upon a transport truck.

An important feature in connection with the arrangement of the carrier and packer mechanism is, that the packer shaft operates three revolutions to one revolution of the endless chain carriers and as there are three spur members upon the sheaf carriers these are arranged in step with the packers so that the packers will always engage the sheaf as it arrives at the top of the elevator and will pass the same onward in the shock.

What we claim as our invention is:—

1. In an automatic machine for shocking grain, the combination with the binder machine, of a frame extending from the binder machine, a sheaf receptacle arranged in said frame, means for carrying the sheaves from the binder machine to the sheaf receptacle, means for forming a shock, means for depositing the shock butt end on the ground to retain its formation without binding, and means automatically operated simultaneously with the commencement of the operation of the shock depositing means adapted to hold the sheaves delivered from the binder machine from contact with the sheaf carrying means for arresting the passing of the sheaves to the sheaf receptacle during the operation of discharging the shock.

2. In an automatic machine for shocking grain, the combination with the binder machine, of a frame extending from the binder machine, a sheaf receptacle arranged in said frame, means for carrying the sheaves from the binder machine to the sheaf receptacle, means for packing the sheaves to form a shock, means for depositing the shock butt end on the ground to retain its formation without binding, means operatively connected with said packing means for starting the discharge means into operation, and means for withholding the passage of sheaves to the sheaf receptacle during the discharging operation.

3. In a machine for shocking grain, the combination with the binder machine, of a frame extending from the binder machine, a sheaf receptacle arranged in said frame, an endless carrier adapted to convey the sheaves from the binder machine to the sheaf receptacle, means for packing the sheaves to form a shock, means for depositing the shock butt end upon the ground, means operated through the packing means for starting the discharge means into operation, and means operated by the means for starting the discharge of the shock adapted to hold the sheaves out of contact with the endless carriers during the discharging of the shock.

4. In a machine for shocking grain, the combination with the binder machine, of a frame extending from the binder machine, a sheaf receptacle arranged in said frame, an endless carrier adapted to convey the sheaves from the binder machine to the sheaf receptacle, means for packing the sheaves to form a shock, means for depositing the shock butt end upon the ground, means operated through the packing means for starting the discharge means into operation, guide arms arranged each side of the endless carrier adapted to be lifted upwardly to raise the sheaves in transit out of contact with the endless carrier, and means operated coincident with the operation of the means for starting the discharge for lifting said guide arms.

5. In a machine for shocking grain, the combination with the binder machine, of a frame extending from the binder machine, a sheaf receptacle arranged in said frame, an endless carrier adapted to convey the sheaves from the binder machine to the sheaf receptacle, means for packing the sheaves to form a shock, means for depositing the shock butt end upon the ground, means for starting the discharge means into operation, means operated from the packing means for operating said starting means, guide arms arranged each side of the endless carrier adapted to be lifted upwardly to raise the sheaves in transit out of contact with the endless carrier, and means connected with the means for starting the discharge means adapted to lift said guide arms to arrest the passing of the sheaves to the sheaf receptacle.

6. In a machine for shocking grain, the combination with the binder machine, of a frame extending from the binder machine, a sheaf receptacle arranged in said frame, a pair of endless carriers extending angularly upward and outward from below the grain deck of the binder machine, guide arms arranged at each side of said carriers and pivoted at their lower ends, a bar extending transversely below said carriers and having upwardly extending members secured to said guide arms, means for packing the sheaves to form a shock, means for depositing the shock butt end on the ground, and means operated through the packing means for starting the discharge means into operation and coincidently lifting the rod connected to said guide arms to raise said guide arms to hold the sheaves out of engagement with said carriers during the discharge of the shock.

7. In a machine for shocking grain, the combination with the binder machine, of a frame extending from the binder machine, a sheaf receptacle arranged in said frame, spur members pivotally secured to said endless carriers and extending outwardly therefrom, curved links pivotally secured at one end to said spur members near their outer ends and at the other end pivotally connected to said endless carriers and adapted to fold said spurs back as the carriers pass around their supporting wheels, means adapted to hold the sheaves temporarily out of reach of said spurs during the discharge of the shock, means for packing the sheaves to form a shock, means for depositing the sheaves butt end on the ground, and means operated by the packing means for starting the discharge means into operation and coincidently operating the means for holding the sheaves out of contact with said carriers.

8. In a machine for shocking grain, the combination with the binder machine, of a frame extending from the binder machine, a sheaf receptacle arranged in said frame, a main driving shaft journaled on said frame, means for carrying the sheaves from the binder machine to the sheaf receptacle, a packer shaft journaled above said sheaf receptacle and operated from said main shaft, packer forks carried on said packer shaft adapted to pass the sheaves from the carrier to the sheaf receptacle and to form the shock, means for depositing the shock butt end on the ground, means connected with said main shaft for operating said discharge means, and means operatively connected to said packer forks for starting said discharge operating means into operation.

9. In a machine for shocking grain, the combination with the binder machine, of a frame extending from the binder machine, a sheaf receptacle pivotally supported in said frame, a main driving shaft journaled on said frame, means for carrying the sheaves from the binder machine to the sheaf receptacle, means operated from said main shaft adapted to swing said sheaf receptacle rearwardly and upwardly to discharge the shock butt end on the ground, a packer shaft journaled above said sheaf receptacle and operated from said main shaft, packer forks carried on said packer shaft adapted to pass the sheaves from the carrier to the sheaf receptacle and to form the shock, and means operatively connected to said packer forks for starting the mechanism for swinging the sheaf receptacle into operation.

10. In a machine for shocking grain, the combination with the binder machine, of a frame extending from the binder machine, a sheaf receptacle pivotally supported in said frame, a main driving shaft journaled on said frame, means for carrying the sheaves from the binder machine to the sheaf receptacle, means operated from said main shaft adapted to swing said sheaf receptacle rearwardly and upwardly to discharge the shock butt end on the ground, a packer shaft journaled above said sheaf receptacle and operated from said main shaft, packer forks carried on said packer shaft adapted to pass the sheaves from the carrier to the sheaf receptacle and to form the shock, a clutch member on the main shaft adapted to be operated to throw the means for swinging the sheaf receptacle into gear, a rod supported from the frame and adapted to operate said clutch, an arm pivotally secured to said rod having a hook member thereon, a wheel secured to said main shaft having a projecting crank pin adapted to engage said hook member to lift said rod and operate said clutch, spring means for holding said hook member out of operating contact with said crank pin, and means operatively connected with said packer forks adapted to move said hook member into position to engage said crank pin.

11. In a machine for shocking grain, the combination with the binder machine, of a frame extending from the binder machine, a sheaf receptacle pivotally supported in said frame, a main driving shaft journaled on said frame, means for carrying the sheaves from the binder machine to the sheaf receptacle, means operated from said main shaft adapted to swing said sheaf receptacle rearwardly and upwardly to discharge the shock butt end on the ground, a packer shaft journaled above said sheaf receptacle and operated from said main shaft, packer forks carried on said packer shaft adapted to pass the sheaves from the carrier to the sheaf receptacle and to form the shock, a clutch member on the main shaft adapted to be operated to throw the means for swinging the sheaf receptacle into gear, a rod supported from the frame and adapted to operate said clutch, an arm pivotally secured to said rod having a hook member thereon, a wheel secured to said main shaft having a projecting crank pin adapted to engage said hook member to lift said rod and operate said clutch, a loop member pivotally supported and extending around said arm carrying the hook and adapted to be swung on its pivot to engage a projection on said arm and to hold said hook member in the path of said crank pin, a rod pivotally connected to said loop and extending through a rigid bracket extension on said arm, a spiral compression spring encircling said arm and adapted to swing said loop over the projection on said arm, a rod engaging said arm adapted to swing it inwardly toward the crank pin, a crank rod carried on said frame and connected to the opposite end of the rod for operating said arm, and a link connected to said crank rod and to one of said packer forks adapted to rock said crank rod to throw the clutch operating mechanism into gear to swing the sheaf receptacle to discharge the shock.

12. In a machine for shocking grain, the combination with the binder machine, of a frame extending from the binder machine, a bail member open at the top and pivotally supported from the frame, a scoop shaped sheaf receptacle carried by said bail, a main shaft journaled on said frame, a bevel pinion loosely mounted on said main shaft, a clutch on said main shaft adapted to engage and rotate said pinion, a bevel gear journaled adjacent to said main shaft and meshing with said pinion, a crank arm carried by said bevel gear, a roller contact on the outer end of said crank arm, a bent cam bar connected to said bail and engaged by the roller contact of said crank arm and formed so that as the crank rotates the bail is first swung rearwardly to discharge the shock butt end on the ground and then swung upwardly to clear the top of the shock and finally swung downwardly to its normal lower position, means for carrying the sheaves to said sheaf receptacle, packer means for forming the shock, means operated from said packer means for operating said clutch to start the discharge mechanism.

13. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, a toothed member rotatably arranged in said sheaf receptacle, a cranked bar adapted to follow the sheaf receptacle and to hold the shock in said receptacle during the rearwardly tilting movement, means for rotating said toothed member and arresting the following movement of said cranked bar to release the shock, and means for returning the sheaf holder to its normal position.

14. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, a bar arranged transversely of said sheaf receptacle and journaled therein having projecting teeth and a crank end extending through the outer side of the receptacle, means connected to the crank end of said bar adapted to hold said teeth in a substantially right angular position in relation to the sheaf receptacle during the first part of the swinging movement, means for releasing said toothed bar to release the shock, means for engaging and holding the upper and outer side of the shock during the first part of the swinging of the sheaf receptacle, and means for returning the holding means to their normal position on the return of the sheaf receptacle.

15. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, a bar arranged transversely of said sheaf receptacle and journaled therein having projecting teeth and a crank end extending through the outer side of the receptacle, a link pivotally secured to the outer side of the bail adjacent to the bottom, a rod connecting the outer end of said link and the crank end of said toothed bar, a rigid arm extending downwardly from the axis of rotation of the bail, an arm pivotally supported adjacent to said rigid arm, a rod pivotally connected to the outer end of said pivotal arm and to the outer end of the link connected to the cranked toothed bar and adapted to engage in locking contact with a lug on the extremity of said pivotal arm, a rod pivotally secured to said pivotal arm and slidably extending through a lug on said rigid arm and having a stop member on its free end, and a spring encircling the latter rod, said rod being adapted to break said locking contact on the engagement of the stop member with the lug of the rigid arm to release the toothed crank bar.

16. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, a bar arranged transversely of said sheaf receptacle and journaled therein having projecting teeth and a crank end extending through the outer side of the receptacle, means connected to the crank end of said bar adapted to hold said teeth in a substantially right angular position in relation to the sheaf receptacle during the forming of the shock and the first part of the swinging movement, means for releasing said toothed bar to release the shock, means for engaging and holding the upper and outer side of the shock during the first part of the swinging of the sheaf receptacle, means for returning the sheaf receptacle to its normal position, and means for cushioning the return of the sheaf receptacle to its normal position.

17. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, a bar arranged transversely of said sheaf receptacle and journaled therein having projecting teeth and a crank end extending through the outer side of the receptacle, means connected to the crank end of said bar adapted to hold said teeth in a substantially right angular position in relation to the sheaf receptacle during the formation of the shock and the first part of the swinging movement, means for releasing said toothed bar to release the shock, means for engaging and holding the upper and outer side of the shock during the first part of the swinging of the sheaf receptacle, means for returning the sheaf receptacle to its normal position, an arm rigidly supported adjacent to the outer side of the bail, a rod pivotally secured to said arm below the pivotal axis of the sheaf receptacle and extending downwardly and sliding in a bracket secured to said sheaf receptacle, and a spiral spring encircling said rod and adapted to absorb the jolt of the return of the sheaf receptacle.

18. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, means carried on the sheaf receptacle for holding the shock during the first part of the movement of the sheaf receptacle, means for releasing said holding means, a crank bar journaled on the axis of the bail, a guide bar for the sheaves secured to said crank bar and extending outwardly and downwardly therefrom, a rigid arm extending downwardly from the axis of the bail, a rod pivotally secured at one end to said rigid arm and at the other end to said guide bar adjacent to its bottom end, and a bar pivotally connected at one end to said guide bar and at its other end to the bail.

19. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, means carried on the sheaf receptacle for holding the shock during the first part of the movement of the sheaf receptacle, means for releasing said holding means, a crank bar journaled on the axis of the bail, a guide bar for the sheaves secured to said crank bar and extending outwardly and downwardly therefrom, means connecting said guide bar with the sheaf receptacle to cause it to swing with the said receptacle and to grip the shock, and a member carried on the upper end of said guide bar having fork points adapted to engage sheaves at the top of the shock.

20. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, means for holding the shock in said receptacle during the tilting of the shock, means for releasing said shock holding means, and a guard shoe rigidly supported from the frame at the inner side and extending to the rear of the sheaf receptacle and adapted to engage the shock immediately following the depositing of same upon the ground to insure the proper locating of the last sheaf or sheaves of the shock in their standing position and to steady the shock.

21. In a machine for shocking grain, the combination with the binder machine, of a frame extending from the binder machine, a sheaf receptacle arranged in said frame, an inclined endless carrier extending upwardly from below the grain deck of the binder machine, a stripper pivotally supported from the knotter of the binder machine, a rod extending from the outer end of said stripper and sliding in a stationary bracket, a spiral compression spring encircling said rod, a rod connected to the outer end of said stripper and extending angularly upward above the carrier to hold the sheaves to said carrier, guide arms pivotally connected to the upper end of the latter rod and extending over the sheaf receptacle, means for forming the shock, and means for depositing the shock butt end upon the ground.

22. In a machine for shocking grain, the combination with the binder machine, of a bar pivotally connected to a bracket on the forward side of the binder machine below the grain deck and extending laterally outward, a caster wheel arranged at the outer end of said bar, a bar rigidly connected to the aforesaid bar and extending angularly rearward and pivotally connected to the binder machine below the grain deck, a U-shaped frame rigidly supported above the frame formed by said bars having the open side to the rear and supported in an outwardly and upwardly inclined position, a shield extending upwardly from the lower frame at the closed end of the U-frame and forming a support for the butts of the sheaves, a main shaft journaled above the inner side of said U-frame, a bail supported at the open rear end of said U-frame, a sheaf receptacle carried by said bail, means for carrying the sheaves from the binder machine and discharging them into said sheaf receptacle, means supported from said U-frame for forming the shock, and means for discharging the shock unbound, butt end upon the ground.

23. In a machine for shocking grain, the combination with the binder machine, of a frame extending from the binder machine, a sheaf receptacle supported from said frame, a frame adjustably supported upon the aforesaid frame, a pair of inclined endless carriers extending upwardly from below the grain deck of the binder machine and supported one on each of said frames, a butt support for the sheaves carried on said movable frame, means for shifting said adjustable frame forwardly or backwardly in relation to said stationary frame, means for forming the shock in said sheaf receptacle, and means for discharging the shock butt end upon the ground without binding.

24. In a machine for shocking grain, in combination with the binder machine, a frame pivotally connected with and extending outwardly from the binder machine, a pivotal sheaf receptacle arranged in said frame and adapted to be swung rearwardly and upwardly to deposit the shock butt end on the ground without binding, an endless carrier extending angularly upward and outward from below the grain deck of the binder machine and adapted to deposit the sheaves in said receptacle, means for packing the sheaves in said receptacle to form a shock, means for swinging the sheaf receptacle to unload the shock, means for holding the shock securely during the first part of the movement of the sheaf receptacle, means for releasing the shock at the proper period of the operation, means actuated by the packer means for starting the means for operating the unloading of the shock, means for insuring the retention of the last sheaves in their standing position and for steadying the shock, means for returning the shock unloading mechanism to normal, and means for arresting the passage of the sheaves to the sheaf receptacle during the unloading operation.

25. In a machine for shocking grain, the combination with the binder machine, of a frame extending from the binder machine, a bail member open at the top and pivotally supported from the frame, a scoop-shaped sheaf receptacle carried by said bail, means for carrying the sheaves to said receptacle, means for swinging said bail and sheaf receptacle rearwardly and upwardly to deposit the shock butt end upon the ground, a crank bar journaled transversely in said sheaf receptacle, teeth of triangular formation secured to said crank bar and forming V-shaped recesses to receive the straw, means connected with the crank end of said bar adapted to hold the teeth in a substantially right angular position in relation to the receptacle during the formation of the shock and the first part of the swinging movement, means for releasing said crank bar to release the shock, means for engaging and holding the upper and outer side of the shock during the first part of the discharging movement of the receptacle, and means for returning the sheaf receptacle to its normal position.

26. In a machine for shocking grain, the combination with the binder machine, of a frame pivotally connected below the grain deck of the binder, a wheel support carrying the outer side of said frame, a sheaf receptacle carried in said frame, a carrier extending upwardly from below the grain deck and conveying the sheaves to said sheaf receptacle, a guard member flexibly connected to the binder machine above the grain deck and extending upwardly above said carrier and flexibly connected to the shocker frame, means for forming the shock, means for discharging the shock, and a flexible driving connection between the means for operating the shocker and the binder machine mechanism.

Signed at the city of Hamilton, county of Wentworth, Ontario, Canada, this 16th day of May, 1914.

THOMAS ARTHUR WOOLLEY.
HERBERT FOX.

Witnesses:
E. HERON,
H. L. TRIMBLE.

Copies of this patent may be obtained for five cents each, by addressing the "Commissioner of Patents, Washington, D. C."